US007867776B2

(12) United States Patent
Kennedy et al.

(10) Patent No.: US 7,867,776 B2
(45) Date of Patent: Jan. 11, 2011

(54) PRIMING MODULE FOR MICROFLUIDIC CHIPS

(75) Inventors: Michael J. Kennedy, Los Gatos, CA (US); Alexander A. Gefter, San Francisco, CA (US)

(73) Assignee: Caliper Life Sciences, Inc., Mountain View, CA (US)

( * ) Notice: Subject to any disclaimer, the term of this patent is extended or adjusted under 35 U.S.C. 154(b) by 1379 days.

(21) Appl. No.: 10/839,336

(22) Filed: May 6, 2004

(65) Prior Publication Data

US 2004/0203055 A1 Oct. 14, 2004

Related U.S. Application Data

(63) Continuation of application No. 11/084,245, filed on Feb. 27, 2002, now abandoned.

(60) Provisional application No. 60/273,001, filed on Mar. 2, 2001.

(51) Int. Cl.
*G01N 1/10* (2006.01)

(52) U.S. Cl. ........................ 436/180; 422/68.1; 422/99; 422/100; 204/601

(58) Field of Classification Search ................ 422/68.1, 422/99-100; 204/601; 436/180
See application file for complete search history.

(56) References Cited

U.S. PATENT DOCUMENTS

| | | | |
|---|---|---|---|
| 4,390,403 | A | 6/1983 | Batchelder |
| 4,908,112 | A | 3/1990 | Pace |
| 5,126,022 | A | 6/1992 | Soane et al. |
| 5,498,392 | A | 3/1996 | Wilding et al. |
| 5,571,410 | A | 11/1996 | Swedberg et al. |
| 5,585,069 | A | 12/1996 | Zanzucchi et al. |
| 5,593,838 | A | 1/1997 | Zanzucchi et al. |
| 5,603,351 | A | 2/1997 | Cherukuri et al. |
| 5,635,358 | A | 6/1997 | Wilding et al. |
| 5,637,469 | A | 6/1997 | Wilding et al. |

(Continued)

FOREIGN PATENT DOCUMENTS

| | | |
|---|---|---|
| WO | WO9604547 | 2/1996 |
| WO | WO9702357 | 1/1997 |

OTHER PUBLICATIONS

Dasgupta, P.K. et al., "Electroosmosis: A Reliable Fluid Propulsion System for Flow Injection Analysis," Anal. Chem. (1994) 66:1792-1798.

(Continued)

*Primary Examiner*—Jyoti Nagpaul

(57) ABSTRACT

Methods and apparatuses for priming sample substrates such as DNA sipper chips are disclosed. According to one aspect of the present invention, a priming system that is suitable for priming a substrate which has a plurality of wells and at least one channel includes a base unit and a top unit. The base unit is arranged to accommodate, or support, the substrate. The top unit, which is substantially physically separate from the base unit, fits over the substrate when the substrate is held by the base unit. The top unit includes an adapter portion that interfaces with the substrate. Included in the adapter portion is a first cavity that is used to facilitate pressurizing a first well of the substrate when the adapter portion is interfaced with the substrate such that the first cavity is aligned with the first well.

13 Claims, 5 Drawing Sheets

U.S. PATENT DOCUMENTS

| | | | | |
|---|---|---|---|---|
| 5,699,157 | A | 12/1997 | Parce | |
| 5,716,852 | A | 2/1998 | Yager et al. | |
| 5,750,015 | A | 5/1998 | Soane et al. | |
| 5,800,690 | A | 9/1998 | Chow et al. | |
| 5,858,187 | A | 1/1999 | Ramsey et al. | |
| 5,858,195 | A | 1/1999 | Ramsey | |
| 5,869,004 | A | 2/1999 | Parce et al. | |
| 5,876,675 | A | 3/1999 | Kennedy | |
| 5,880,071 | A | 3/1999 | Parce et al. | |
| 5,882,465 | A | 3/1999 | McReynolds | |
| 5,885,470 | A | 3/1999 | Parce et al. | |
| 5,932,100 | A | 8/1999 | Yager et al. | |
| 5,942,443 | A | 8/1999 | Parce et al. | |
| 5,948,227 | A | 9/1999 | Dubrow | |
| 5,955,028 | A | 9/1999 | Chow | |
| 5,958,694 | A | 9/1999 | Nikiforov | |
| 5,959,291 | A | 9/1999 | Jensen | |
| 5,965,410 | A | 10/1999 | Chow et al. | |
| 5,976,336 | A | 11/1999 | Dubrow et al. | |
| 5,989,402 | A | 11/1999 | Chow et al. | |
| 6,001,229 | A | 12/1999 | Ramsey | |
| 6,001,231 | A | 12/1999 | Kopf-Sill | |
| 6,012,902 | A | 1/2000 | Parce | |
| 6,042,709 | A | 3/2000 | Parce et al. | |
| 6,062,261 | A | 5/2000 | Jacobson et al. | |
| 6,074,725 | A | 6/2000 | Kennedy | |
| 6,100,541 | A | 8/2000 | Nagle et al. | |
| 6,120,666 | A | 9/2000 | Jacobson et al. | |
| 6,221,226 | B1 | 4/2001 | Kopf-Sill | |
| 6,235,471 | B1 | 5/2001 | Knapp et al. | |
| 6,280,589 | B1 | 8/2001 | Manz et al. | |
| 6,495,104 | B1 * | 12/2002 | Unno et al. | 422/68.1 |
| 2003/0230488 | A1 | 12/2003 | Lee et al. | |

OTHER PUBLICATIONS

Effenhauser, C.S. et al., "Glass Chips for High-Speed Capillary Electrophoresis Separations with Submicrometer Plate Heights," Anal. Chem. (1993) 65: 2637-2642.

Effenhauser, C.S. et al., "High Speed Separation of Anitsense Oligonucleotides on a Micromachined Capillary Electrophoresis Device," Anal. Chem. (1994) 66: 2949-2953.

Effenhauser, C.S. et al., "Integrated Capillary Electrophoresis on Flexible Silicone Microdevices: Analysis of DNA Restriction Fragments and Detection of Single DNA Molecules on Microchips," Anal. Chem. (1997) 69: 3451-3457.

Fan, Z.H. et al., "Micromachining of Capillary Electrophoresis Injectors and Separators on Glass Chips and Evaluation of Flow at Capillary Intersections," Anal. Chem. (1994) 66:177-184.

Fister, J.C. III et al., "Counting Single Chromophore Molecles for Ultrasensitive Analysis and Separations on Microchip Devices," *Anal. Chem.* (1998) 70: 431-437.

Hadd, A.G. et al., "Microfluidic Assays of Acetylcholinesterase," Anal. Chem. (1999) 71: 5206-5212.

Harrison, J. et al., "Capillary Electrophoresis and Sample Injection Systems Integrated on a Planar Glass Chip," Anal. Chem. (1992) 64: 1926-1932.

Harrison, J. et al., "Towards Miniaturized Electrophoresis and Chemical Analysis Systems on Silicon: An Alternative to Chemical Sensors," Sensors and Actuators B (1993) 10: 107-116.

Harrison, J. et al., "Micromachining a Miniaturized Capillary Electrophoresis-Based Chemical Analysis System on a Chip," Science (1993) 261: 895-897.

Harrison, D.J. et al., "Integrated Electrophoresis Systems for Biochemical Analyses," Solid-State Sensor and Actuator Workshop (1994) 21-24.

Jacobson, S.C. et al., "Effects of Injection Schemes and Column Geometry on the Performance of Microchip Electrophoresis Devices," Anal. Chem. (1994) 66:1107-1113.

Jacobson, S.C. et al., "High-Speed Separations on a Microchip," Anal. Chem. (1994) 66:1114-1118.

Jacobson, S.C. et al., "Open Channel Electrochromatography on a Microchip," Anal. Chem. (1994) 66: 2369-2373.

Jacobson, S.C. et al., "Precolumn Reactions with Electrophoretic Analysis Integrated on a Microchip," Anal. Chem. (1994) 66: 4127-4132.

Jacobson, S.C. et al., "Microchip Electrophoresis with Sample Stacking," Electrophoresis (1995) 16: 481-486.

Jacobson, S.C. et al., "Fused Quartz Substrates for Microchip Electrophoresis," Anal. Chem. (1995) 67: 2059-2063.

Jacobson, S.C. et al., "Integrated Microdevice for DNA Restriction Fragment Analysis," Anal. Chem. (1996) 68: 720-723.

Jacobson, S.C. et al., "Electrokinetic Focusing in Microfabricated Channel Structures," Anal. Chem. (1997) 69: 3212-3217.

Jacobson, S.C. et al., "Microfluidic Devices for Electrokinetically Driven Parallel and Serial Mixing," Anal. Chem. (1999) 71: 4455-4459.

Manz, A. et al., "Miniaturized Total Chemical Analysis Systems: a Novel Concept for Chemical Sensing," Sensors and Actuators (1990) B1: 244-248.

Manz, A. et al., "Micromachining of Monocrystalline Silicon and Glass for Chemical Analysis Systems," Trends in Analytical Chemistry (1991) 10:144-149.

Manz, A. et al., "Planar Chips Technology for Miniaturization and Integration of Separation Techniques into Monitoring Systems," Journal of Chromatography (1992) 593:253-258.

Manz, A. et al., "Planar Chips Technology for Miniaturization of Separation Systems: A Developing Perspective in Chemical Monitoring," Advances in Chromatography (1993) 1-66.

Manz, A. et al., "Electroosmotic Pumping and Electrophoretic Separations for Miniaturized Chemical Analysis Systems," J. Micromach. Microeng. (1994) 4: 257-265.

Manz, A. et al., "Parallel Capillaries for High Throughput in Electrophoretic Separations and Electroosmotic Drug Discovery Systems," International Conference on Solid-State Sensors and Actuators (1997) 915-918.

McCormick, R.M. et al., "Microchannel Electrophoretic Separations of DNA in Injection-Molded Plastic Substrates," Anal. Chem. (1997) 69: 2626-2630.

Moore, A.W. et al., "Microchip Separations of Neutral Species via Micellar Electrokinetic Capillary Chromatography," Anal. Chem. (1995) 67: 4184-4189.

Ramsey, J.M. et al., "Microfabricated Chemical Measurement Systems," Nature Medicine (1995) 1:1093-1096.

Seiler, K. et al., "Planar Glass Chips for Capillary Electrophoresis: Repetitive Sample Injection, Quantitation, and Separation Efficiency," Anal. Chem. (1993) 65:1481-1488.

Seiler, K. et al., "Electroosmotic Pumping and Valveless Control of Fluid Flow within a Manifold of Capillaries on a Glass Chip," Anal. Chem. (1994) 66:3485-3491.

Ueda, M. et al., "Imaging of a Band for DNA Fragment Migrating in Microchannel on Integrated Microchip," Materials Science and Engineering C (2000) 12:33-36.

Wang, C. et al., "Integration of Immobilized Trypsin Bead Beds for Protein Degestion within a Microfluidic Chip Incorporating Capillary Electrophoresis Separations and an Electrospray Mass Spectrometry Interface," Rapid Commin. Mass Spectrom. (2000) 14:1377-1383.

Woolley, A.T. et al., "Ultra-High-Speed DNA Fragment Separations Using Microfabricated Capillary Array Electrophoresis Chips," Proc. Natl. Acad. Sci. USA (1994) 91:11348-11352.

Woolley, A.T. et al., "Functional Integration of PCR Amplification and Capillary Electrophoresis in a Microfabricated DNA Analysis Device," Anal. Chem. (1996) 68: 4081-4086.

Woolley, A.T. et al., "High-Speed DNA Genotyping Using Microfabricated Capillary Arras-Electrophoresis Chips," Anal. Chem. (1997) 69:2181-2186.

Woolley, A.T. et al., "Capillary Electrophoresis Chips with Integrated Electrochemical Dtection," Anal. Chem. (1998) 70: 684-688.

Zhang, B. et al., "Microfabricated Devices for Capillary Electrophoresis-Electrospray Mass Spectrometry," Anal. Chem. (1999) 71:3258-3264.

* cited by examiner

PRIMING MODULE FOR MICROFLUIDIC CHIPS

CROSS REFERENCE TO RELATED APPLICATION

This application is a continuation of U.S. application Ser. No. 10/084,245, filed Feb. 27, 2002, now abandoned, which claims benefit to U.S. Provisional Patent Application No. 60/273,001, filed Mar. 2, 2001, which is incorporated herein by reference in its entirety for all purposes.

BACKGROUND OF THE INVENTION

1. Field of Invention

The present invention relates generally to systems and methods for performing chemical and biological analyses. More particularly, the present invention relates to a priming module with an adapter that enables a single priming module to be used for priming a variety of both single channel and multiple channel microfluidic chips.

2. Description of the Related Art

Microfluidic analytical techniques are often used in chemical and biological testing because of advantages such as the ability to employ small sample sizes. Microfluidic analysis generally involves the movement of minute quantities of fluid substances. The use of microfluidic analysis is particularly useful when DNA samples are being tested, as DNA samples are typically gathered in relatively small sample sizes.

Samples which are to be analyzed using microfluidic analytical techniques should be held by or within a suitable "sample receiver." As such, sample-receiving substrates, or microfluidic substrates, are often used to perform chemical and biological analyses, e.g., DNA analysis of biological specimens. Microfluidic substrates generally have networks of chambers connected by channels which have mesoscale dimensions such that at least one dimension usually falls in the range of between 0.1 micrometers (μm) and 500 μm.

Sample substrates such as DNA sipper chips, which are microfluidic substrates that have at least one sipper coupled thereon, are typically primed prior to testing. Chips are generally primed for sample analysis to prevent, for example, air bubbles from being present in matrix mixtures that are used to fill channels, and wells, within a chip. The presence of air bubbles in matrix mixtures in a chip may adversely affect the testing of chemical or biological samples using the chip. Priming may also draw a marker mix into the chip, and if the chip includes a sipper, initiates the sipper, as will be appreciated by those skilled in the art.

The priming of a chip, if performed inaccurately or incorrectly, may cause an analysis performed using the chip to be erroneous and, hence, unreliable. Further, if a test on a minute sample of material is incorrectly performed, repeating the test may be difficult, as there may not be enough of a material sample available to perform a new test. As it is often not known at the time a test is made whether the chip has been primed correctly, it is important to make certain that priming procedures are accurate, and that priming apparatuses are precise, to reduce the likelihood of inaccurate test results.

Priming stations are often used to support a chip during a priming process to enhance the repeatability of a priming process, and to increase the likelihood that a priming procedure occurs correctly. One conventional priming station has a base which is designed to support a chip, and a top which is coupled to the base in a "clam shell," or hinged, configuration. A syringe is generally coupled to the top such that the syringe may pressurize a well on a chip when the top of the priming station is sealed over the base of the priming station. The syringe primes one well on the chip at a time. As a result, when more than one well is to be primed, the top of the priming station is unsealed from the base of the priming station, and altered such that a different well on the chip may be primed. For each well that is to be primed on a given chip, the priming station is altered.

The use of a hinged priming station is effective in priming a chip. However, priming only one well at a time is inefficient when the priming of more than one well is desired. In addition, conventional priming stations are generally specific to a particular chip configuration. That is, conventional priming stations are generally arranged such that any given priming station is only appropriate for priming a chip with a particular topography, or configuration. Hence, if chips of more than one configuration are to be tested, then multiple priming stations may be required, which is costly and inefficient.

Therefore, what is needed is a priming system which may be modified for use with a variety of different chip configurations, including configurations in which more than one well is to be primed. That is, what is desired is an overall priming system which is both capable of priming chips of different types and configurations, and is relatively inexpensive.

BRIEF SUMMARY OF THE INVENTION

The present invention relates to a modular priming system for sample substrates such as DNA sipper chips. According to one aspect of the present invention, a priming system that is suitable for priming a substrate, which has a plurality of wells and at least one channel, includes a base unit and a top unit. The base unit is arranged to accommodate, or support, the substrate. The top unit fits substantially over the substrate when the substrate is held by the base unit. The top unit includes an adapter portion that interfaces with the substrate. Included in the adapter portion is a first cavity that is used to facilitate pressurizing a first well of the substrate when the adapter portion is interfaced with the substrate such that the first cavity is aligned with the first well. In one embodiment, the top unit includes a top plate which may be decoupled from the adapter portion, i.e., the adapter portion is separable from the remainder of the top unit.

In another embodiment, the priming system also includes a pumping unit which cooperates with the adapter portion to pressurize the first well. In such an embodiment, the first cavity may include a first pressure port or opening and a corresponding seal which is used by the pumping unit to pressurize the first well, e.g., through the first cavity and the first pressure port.

The use of a priming unit which has an adapter portion that is separable from the remainder of the priming unit enables a variety of different adapter portions to be used as a part of the priming unit. As each adapter portion supports a particular chip type or chip configuration, the use of multiple adapter portions allows for efficient priming, as a single priming unit to be used to prime, e.g., pressurize, differently configured chips for testing. Some adapters are arranged with manifolds, or interconnected channels and cavities, which enable multiple wells and capillaries of a chip to be pressurized at substantially the same time, thereby at least partially reducing the amount of time required for a priming process to occur.

According to another aspect of the present invention, a priming system which is suitable for priming a first substrate of a first configuration and a second substrate of a second configuration includes a base unit and a first top unit that includes an adapter portion. The base unit is sized to accommodate different types of substrates such as the first substrate and the second substrate. The first adapter portion interfaces substantially directly with the first substrate and includes a first cavity. The first adapter portion enables one or more wells of the first substrate to be pressurized or primed when the first adapter portion is interfaced with the first substrate such that the first cavity is aligned with a well when the first substrate is positioned on the base unit. The top unit may be coupled to the base unit in order to support the first substrate between the first adapter unit and the base unit.

In one embodiment, the priming system includes a second adapter unit which may be coupled to the top unit when the first adapter unit is not coupled to the top unit. The second adapter unit may interface with the second substrate to facilitate the pressurization of at least one well associated with the second substrate.

According to yet another aspect of the present invention, an adapter module that is suitable for use in priming a substrate which has a plurality of wells includes a first interface, a plurality of cavities, at least one channel, and a first pressure port and seal. The first interface enables at least a portion of a pump mechanism to be received by the adapter module. The channel is fluidly coupled to the first interface, and is in fluid communication with the plurality of cavities. The first pressure port and seal is positioned at least partially within one of the cavities such that when the adapter module is positioned over the substrate, the first pressure port and seal within the cavity is arranged to be positioned over a first well selected from the plurality of wells to prime the first well. In one embodiment, a second pressure port and seal is positioned within another cavity such that a second well may be primed through the second pressure port at substantially the same time that the first well is primed.

In accordance with still another aspect of the present invention, a method for priming a chip which has wells and channels includes selecting an adapter module that is suitable for use for substantially only a first configuration of the chip. The adapter module is selected from amongst multiple adapter modules which may be suitable for other chip configurations. The method involves positioning the chip on a base plate. The adapter module is positioned and secured over the chip on the base plate, and the chip is pressurized through the adapter module. In one embodiment, the adapter module defines cavities and includes at least one pressure port and seal positioned within a selected cavity. In this embodiment, positioning the adapter module over the chip includes aligning the cavities with the wells by aligning the pressure port and seal within the selected cavity with the selected well.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION

By designing a priming station to accommodate more than one chip or sample substrate configuration, the priming station may be used more efficiently. For example, parts of a priming station designed to support and position a chip may be suitable for use by chips of a variety of different configurations, while an adapter module of the chip may be varied as needed for different chips. The adapter module may be arranged to be readily swapped into and out of the overall priming station. Permitting components of a priming station to remain essentially "constant," while exchanging adapter modules, may substantially maximize the use of the constant components. In other words, enabling a priming station to take on different "personalities," e.g., have different configurations, through the use of adapters allows a priming station to be used efficiently.

A priming station with adapter, or "personality," modules may be configured to fill, or pressurize, more than one well or channel in a chip. Some adapter modules or units may be arranged with a single pressure port, while other adapter modules may be arranged with multiple pressure ports, e.g., up to eight pressure ports or more. As a result, a priming station with various adapters may effectively be configured to prime any number of wells simultaneously.

New or different chip designs which are to be primed may each effectively require only a different personality module to allow a chip of the new or different chip design to be primed. That is, many design features of a chip may be accommodated by designing a personality module for the chip, rather than designing an entire priming station. Hence, one priming station may be used for priming multiple chips through the use of multiple personality modules. Therefore, when a chip with a new configuration is designed, rather than requiring a new priming station to be designed, an existing priming station with a new personality module that corresponds to the new configuration may be used to prime the chip.

Figure 1:
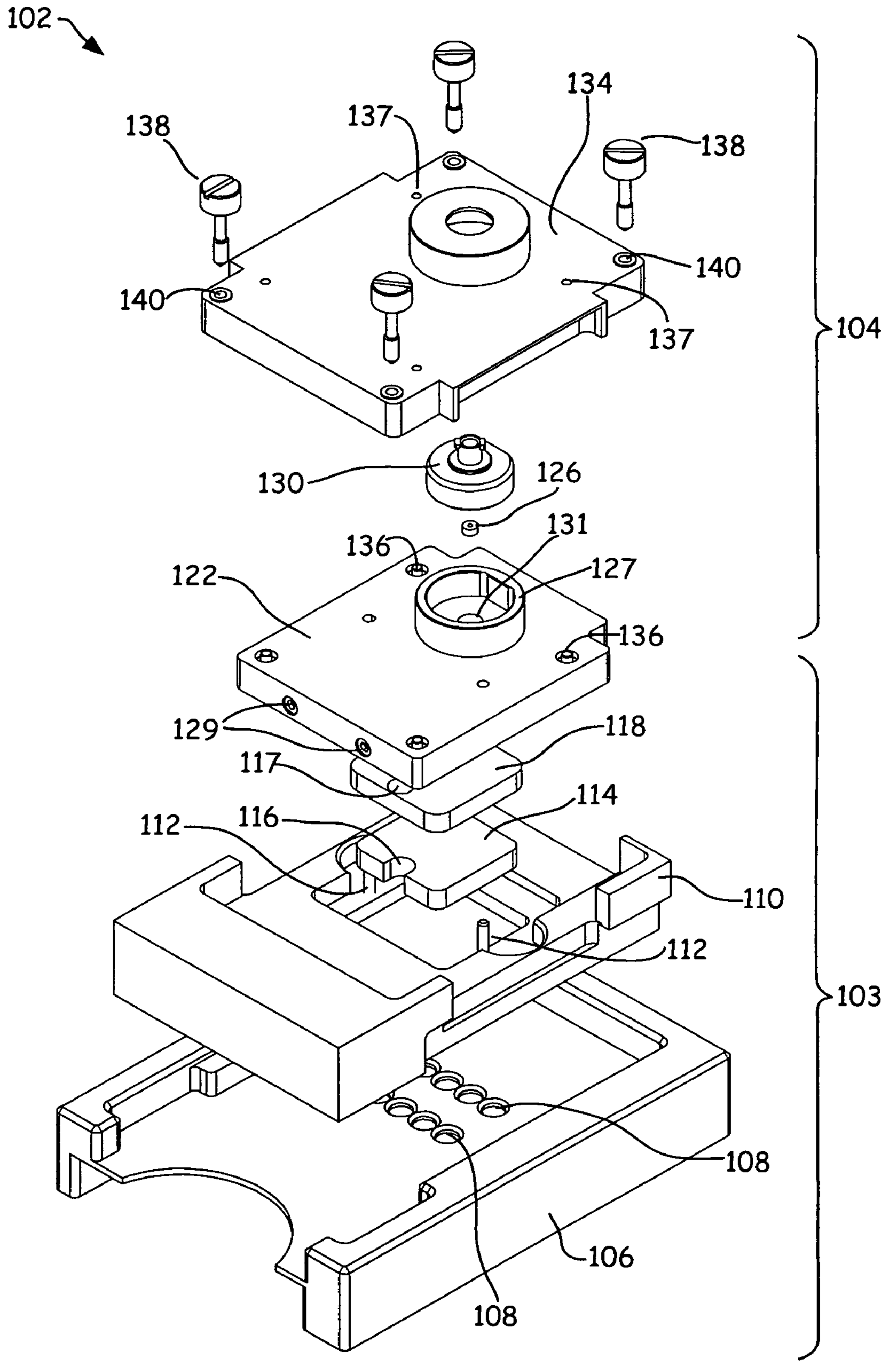
FIG. 1 is a diagrammatic exploded representation of a priming station or module in accordance with an embodiment of the present invention.

FIG. 1 is a diagrammatic exploded representation of a priming station or module in accordance with an embodiment of the present invention. A priming station 102 may be used to prime a chip, e.g., a microfluidic chip, which is suitable for use in performing chemical and biological analyses. One example of a microfluidic chip is a DNA sipper chip. Priming station 102, however, may be suitable for priming a variety of microfluidic chips including, but not limited to, planar chips, sipper chips, protein chips, and fluorogenic chips. Although the present invention is described as being suitable for use with a chip such as a DNA sipper chip, it should be understood that the present invention is suitable for use with substantially any microfluidic chip.

A chip assembly, or a sample substrate, may be substantially any size, as for example a chip assembly of a 50 millimeter (mm) format or a chip assembly of a 70 mm format. A chip assembly or chip may also include any number of channels and wells, as well as sippers, depending upon the requirements of a particular test that is to be performed using the chip. In general, a sipper is a capillary that extends from and is in fluid communication with a chip. In one embodiment, a chip may be a sipper chip with three-dimensional channels. Additionally, a sipper may be a capillary that is strengthened with a polyimide coating.

In general, priming station 102 includes a base unit 103 and a top unit 104. When a chip is positioned within priming station 102, the chip is positioned on a pressure block 118, or pressure plate, which, along with a pressure pad 114, is fitted into a base plate 110 that is a part of base unit 103. Pressure block 118 includes an opening 117 through which a sipper on a chip may be inserted. Similarly, pressure pad 114 includes an indentation 116 which is arranged to accommodate a sipper. It should be understood that the locations of opening 117 and indentation 116 may vary, depending upon the orientation of a sipper with respect to the chip. Pressure block 118 and pressure pad 114, which may be a foam pad, effectively function as a spring to facilitate the placement and removal of a chip on base plate 110.

In addition to enabling pressure block 118 and pressure pad 114 to be inserted within base plate 110, base plate 110 includes at least one pin 112 that is used to aid in placing a chip into base plate 110. That is, pin 112 is used to locate and position a chip when the chip is inserted into base plate 110. Pressure block 118 and pressure pad 114 may cooperate to effectively push a chip against pin 112. Base plate 110 is positioned within a filling station base 106 that may also include openings 108 through which fluid may be drawn, e.g., with respect to a chip positioned in base plate 110.

Priming station 102, as previously mentioned, also generally includes top unit 104 which serves to cover a chip placed on base plate 110 of base unit 103. The top portion, which includes a top plate 134, is typically arranged to support either a manual pump or an automatic pump which is used to prime a chip. Top plate 134 may be coupled through a coupling element such as an adapter 130, e.g., a luerlock, and a gasket 126, e.g., a silicone gasket, to an adapter receptacle 127 in personality module 122. Receptacle 127 includes one or more openings 131 so that pressure which is applied via adapter 130 to personality module 122 may be communicated to each of cavities 208 (shown in FIGS. 2A and 2B) within personality module 122, as will be discussed in greater detail below. The adapter 130 and the gasket 126 enable a pump, e.g., a syringe, to be inserted through top plate 134 and personality module 122 to prime a chip.

Figure 2A:
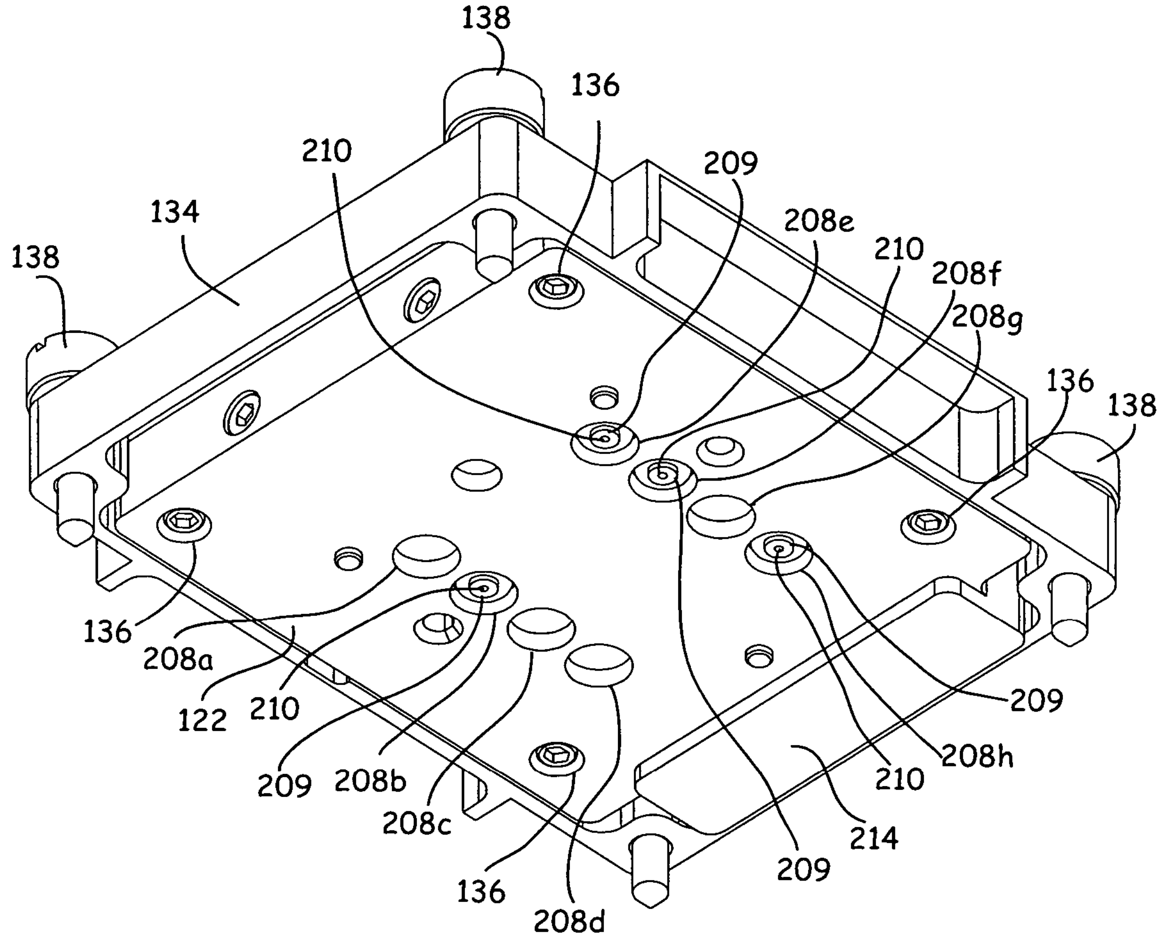
FIG. 2*a* is a diagrammatic perspective representation of a personality module that is fit into a top plate, i.e., personality module 122 and top plate 134 of FIG. 1, in accordance with an embodiment of the present invention.
Figure 2B:
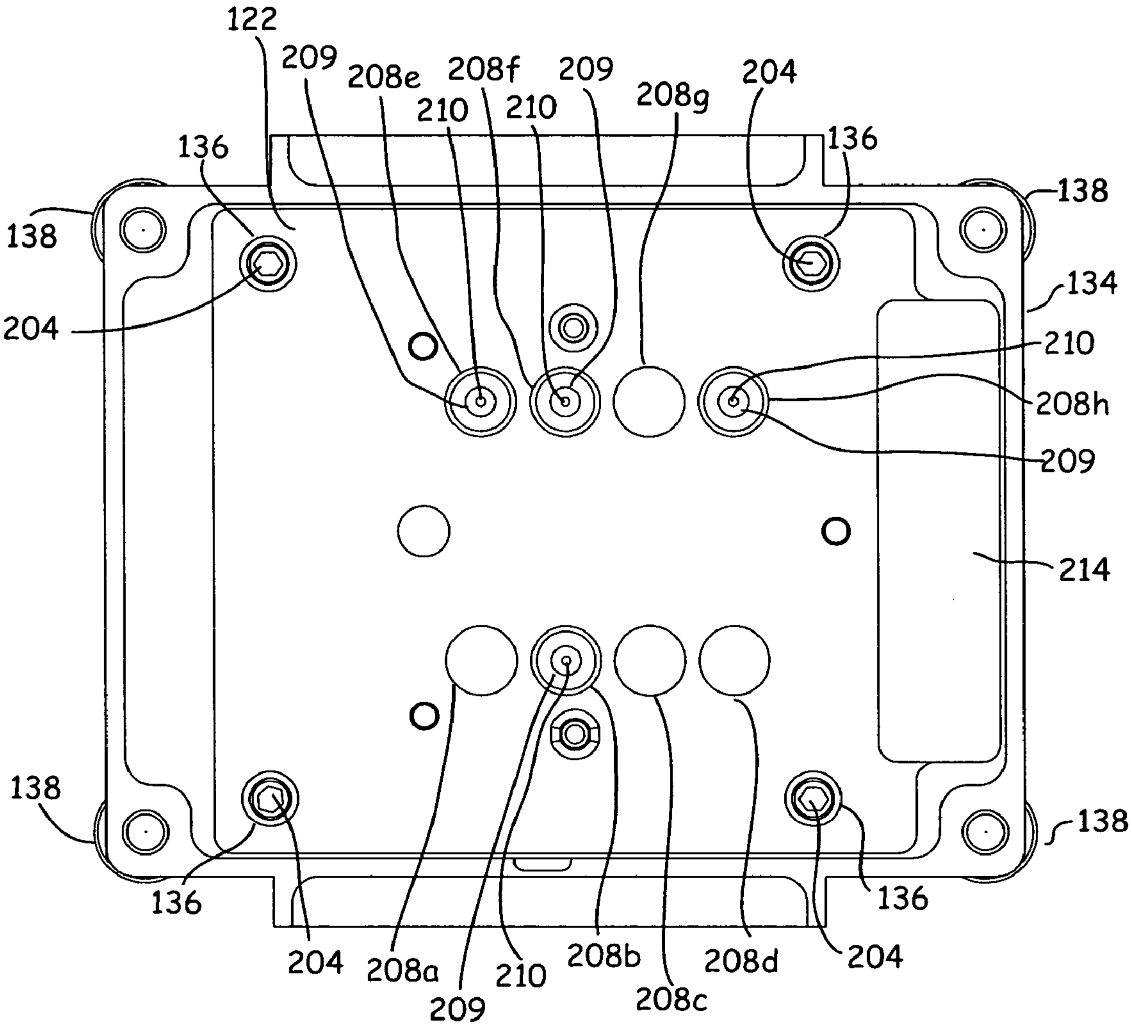
FIG. 2*b* is a diagrammatic bottom view representation of a personality module that is fit into a top plate, i.e., personality module 122 and top plate 134 of FIG. 1, in accordance with an embodiment of the present invention.

Personality module 122, which may be considered to be an adapter module or an adapter, is arranged with openings and seals on a chip-interface side (not shown), as will be described below with reference to FIGS. 2*a* and 2*b*. The openings and seals on the side of personality module 122 that is arranged to contact a chip during priming are arranged to be aligned with wells on the chip. As discussed above, there may be a variety of differently configured personality modules 122 that are suitable for use in priming station 102. Specifically, personality modules 122 may each be configured according to the "personality" of a particular chip that is to be used with a specific personality module 122.

The personality of a chip may include, but is not limited to, physical features of the chip such as the size of the chip, the number of wells on the chip, the orientation of wells on the chip, and the status of wells on the chip, e.g., whether a given well is effectively open or closed. In general, the personality of a chip is dependent upon the topology of the chip, as well as the microfluidic circuits on the chip. That is, the personality of a chip is typically based upon the position of wells on the chip, the number of wells on the chip, and the status of wells on the chip. Hence, the chip-interface side of personality module 122 may be configured as needed to accommodate the topology of a given chip.

The use of different personality modules 122 within priming station 102 enables a single base plate 110 and a single top plate 134 to be used for priming chips of different configurations, e.g., topologies, and application types, e.g., polypropylene or acrylic. Therefore, rather than requiring separate priming modules for each configuration of a chip, a single priming station with various personality modules 122 may be used to prime chips of different configurations. As previously discussed, the use of different personality modules 122 in priming station 120 is more efficient, e.g., more cost efficient and more space efficient, than the use of separate priming stations for each chip configuration.

To secure personality module 122 against top plate 134, screws may be inserted through threaded apertures 136 in personality module 122 and corresponding apertures 137 in top plate 134. In other words, personality module 122 may be screwed into top plate 134, although other fasteners may generally be used to couple personality module 122 to top plate 134. For instance, personality module 122 may be snap fit into top plate 134. The use of screws, as opposed to substantially any other suitable fastener or coupler, facilitates the installation and removal of personality module 122 from top plate 134, thereby facilitating the use of different personality modules 122 within priming station 102.

Fasteners such as screws, e.g., thumbscrews 138, may be inserted through openings 140 in top plate 134 and screwed into openings (not shown) in base plate 110. The use of thumbscrews 138 to secure top plate 134 against base plate 110 such that a chip to be primed is held therebetween enables top plate 134 to be easily coupled to and decoupled from base plate 110. It should be understood that substantially any attachment method may be used and, further, that depending upon the particular application, some attachment methods may be more suitable than others.

The materials used to form the components of priming station 102 may generally be widely varied. By way of example, top plate 134 and base plate 110 may be formed from substantially any durable material. In one embodiment, top plate 134 and base plate 110 may be formed from a material such as anodized aluminum. Personality module 122 may be formed from a material which is substantially resistant to arcing, electrical shorting, and corrosion. That is, the material from which personality module 122 may be formed is generally selected to be a material which does not significantly react with the fluids within a chip or the fluids used in priming the chip. Suitable materials used in the formation of personality module 122 include, but are not limited to, plastics such as delrin, Teflon, and polypropylene. As will be appreciated by those skilled in the art, delrin and Teflon may be machined, while polypropylene may be injection molded.

The size of the various parts of priming station 102 may also vary widely, depending upon factors which include, but are not limited to, the size of the chips which are to be primed using the priming station, as well as the strength of the materials from which the parts are formed. In general, the parts are sized to accommodate a chip, and to interface with other parts. For example, personality module 122 may be sized to mate with a receptacle in the bottom side of top plate 134, while base plate 110 may be sized to tightly receive and position a chip.

Personality module 122, as discussed above, is typically configured to enable certain wells of a chip to be primed. Hence, personality module 122 is arranged to be in fluid communication with a chip when personality module 122 and a chip are substantially in contact. With reference to FIGS. 2*a* and 2*b*, one embodiment of personality module 122 will be described. As shown, personality module 122 is coupled to top plate 134 through screws 204. A chip-interface side, or bottom side, of personality module 122 includes cavities 208, e.g., pressure ports or chambers, which substantially overlap or coincide with wells on a chip when personality module 122 is positioned over a chip. Cavities 208 are fluidly coupled to one another and to opening 131 in receptacle 127 of personality module 122 via a plurality of interconnecting channels (not shown) which are drilled entirely through personality module 122 and which are sealed by pins 129 located on respective opposing sides of personality module 122 as shown in FIG. 1 (only two pins 129 are shown in FIG. 1, it being understood that there would also be two other pins (not shown) sealing the channels on the opposite side of the personality module to thereby seal the channels within the module to the external environment (other than through cavities 208 and inlet opening 131)). The interconnecting channels through personality module 122 allow pressure which is applied through adapter 130 (e.g., via a syringe or pressure pump, for example) and via inlet opening 131 in receptacle 127 to be substantially evenly distributed to one or more of cavities 208 (e.g., cavities 208*b*, 208*e*, 208*f*, and 208*h* in FIG. 2A) so that each of the one or more wells on a chip which coincide with cavities 208*b*, 208*e*, 208*f*, and 208*h* can be substantially simultaneously primed through application of a pressure force through adapter 130. As shown in FIG. 2A, cavities 208*b*, 208*e*, 208*f*, and 208*h* may each include a pressure port 209 including a pressure opening 210 which enables a well on a chip to be primed when pressure is applied through adapter 130, via inlet opening 131 in receptacle 127, and to the interconnecting channels (not shown) which fluidly couple the cavities 208*b*, 208*e*, 208*f*, and 208*h* to inlet opening 131. Each cavity may also include a seal (not shown), for example an O-ring or gasket, for example a silicone gasket similar to gasket 126, which surrounds each pressure port 209 to seal the same when the pressure ports communicate with wells on a chip. The remaining wells in personality module 122 (e.g., wells 208*a*, 208*c*, 208*d*, and 208*g*) do not have pressure ports and are sealed so that pressure is not communicated through those cavities to their corresponding wells on a chip, so that selected combinations of various wells can be primed depending on the configuration of the various cavities 208. Thus, as shown in FIG. 2A, pressure openings 210 included in pressure ports 209 within cavities 208*b*, 208*e*, 208*f*, and 208*h* may be indirectly communicably coupled to a pumping mechanism, e.g., a syringe, that enables pressure ports 209 which come into contact with a well on a chip to prime the well.

By varying both the number of pressure ports 209 and corresponding seals and the location of pressure ports 209 (and their corresponding seals) in different personality modules 122, each personality module 122 may effectively be configured for use with a specific chip. For instance, personality module 122, as shown, would be suitable for priming a chip with eight wells in which four particular wells are to be primed. Another personality module may include eight wells and six pressure ports and, as a result, be arranged to prime a chip with eight wells in which six particular wells are to be primed. Still another personality module may include eight wells and four pressure ports (and seals) which are oriented differently than pressure ports 209 in personality module 122, and so forth. It should be understood that the configuration of personality module 122 may also be dependent upon the interconnections of cavities 208 within personality module 122. As discussed above, each of cavities 208 is fluidly coupled to one another through interconnecting channels in the personality module. However, the personality module 122 may include a manifold which couple certain of cavities 208 such that they are in fluid communication with each other, while other cavities 208 may be arranged to be substantially independent. In addition, the priming system may include two or more adapters 130 which communicate with and are arranged to be received by two or more receptacles 127 in personality module 122 so that specific groups of cavities 208 (e.g., each specific group of cavities being coupled to one another through a common set of communicating channels in module 122) may be independently controlled by pressure applied through one or more of the adapters 130, as another way to independently control the priming of specific wells on a corresponding chip.

Personality module 122 may be configured, as for example as shown, to enable multiple wells in a chip to be primed substantially simultaneously. The ability to prime more than one well at a time increases the efficiency with which a chip may be primed. The time required to prime multiple wells substantially simultaneously may be faster than the time required to prime multiple wells individually. Further, when multiple wells are primed substantially simultaneously, the need for a relatively time-consuming reconfiguration of a priming station for each well that is to be primed may be eliminated.

In addition to including cavities 208 and pressure ports 209 (and their corresponding seals), a chip-interface side of personality module 122 may include various features which may ensure that personality module 122 may be properly aligned over a chip. By way of example, a protrusion 214 at an edge of personality module 122 may prevent top plate 134 from being coupled to a bottom plate, e.g., bottom plate 110 of FIG. 1, unless personality module 122 is appropriately aligned with the bottom plate. Protrusion 214 may be arranged to be engaged by, or inserted into, a bottom plate. Preventing top plate 134 from being coupled to a bottom plate effectively prevents an overall priming module to be used, thereby preventing a chip from being primed incorrectly.

Generally, the configuration of a priming station may vary. For example, while the priming station of FIG. 1 is particularly suitable for use with a manual pump to either increase or decrease pressure within a chip, a priming station may also be configured for use with a computerized, or automatic, pump. Further, additional features may be added to a priming station to facilitate a priming process. One particularly useful feature which may be implemented in a priming station is a set of windows which enable a user to view portions of a chip during priming to ensure that the chip is primed properly.

Figure 3:
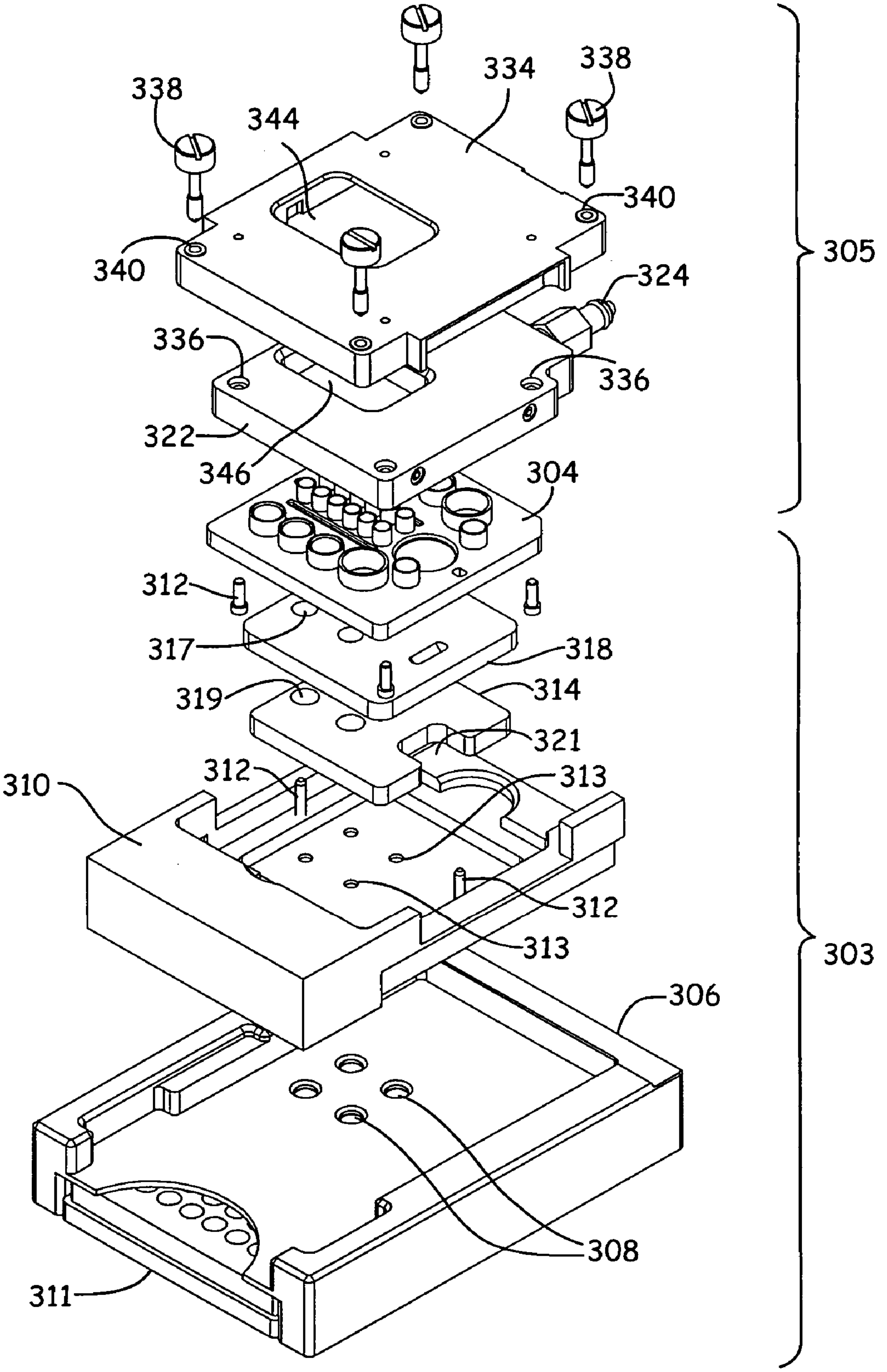
FIG. 3 is a diagrammatic exploded representation of a priming station or module in accordance with another embodiment of the present invention.

FIG. 3 is a diagrammatic exploded representation of a priming module in which a chip is inserted in accordance with a second embodiment of the present invention. A priming module 302 is arranged to hold a chip 304, e.g., a chip associated with a 70 mm format chip assembly, which is to be primed using a computerized or automatic pump. Chip 304 is positioned over a pressure block 318 and a pressure pad 314, which are held within a base plate 310. In the described embodiment, base plate 310 is positioned over a well plate 311 and a filling station base 306. It should be appreciated that pressure block 318, pressure pad 314, base plate 310, and well plate 311 may generally be considered to be a base portion 303 of priming module 302. Openings in filling station base 306, as well as corresponding openings 313 in well plate 311 enables fluid to drain through base plate 310. Filling station base 306 may also include openings 308 which serve as clearance holes for capillaries of chip 304, e.g., clearance holes for sippers (not shown) on chip 304.

Pressure block 318 includes openings 317, and pressure pad 314 includes openings 319 and an indentation 321, which enables sippers (not shown) on chip 304 to pass therethrough.

In general, pressure block 318 and pressure pad 314 effectively serve as a gimbaled spring which facilitates the placement of chip 304 within base plate 310, and facilitates the removal of chip 304 from base plate 310. Pins 312 that are coupled to base plate 310 enable chip 304 to be properly located with respect to base plate 310.

Like priming station 102 of FIG. 1, priming station 302 includes a top portion 305 which serves to cover chip 304 when chip 304 is placed on base plate 310. Top portion 305, in the described embodiment, includes a top plate 334 and a personality module 322. Personality module 322 is arranged with openings and pressure ports on a chip-interface side. One example of a chip-interface side of a personality module was discussed above with respect to FIGS. 2*a* and 2*b*. The openings and pressure ports on the chip-interface side of personality module 322 are arranged to be aligned with wells on the chip 304 during priming, e.g., while chip 304 is positioned within priming module 302.

In one embodiment, personality module 322 includes a pump coupler 324 that is arranged to couple personality module 322 to an external pump, e.g., an automatic or computer-controlled pump, that pressurizes chip 304. Personality module 322 is configured according to the personality of chip 304. By way of example, chip 304 may have multiple wells and, hence, multiple capillaries, which are to be primed. If some wells are to be primed, while others are to remain effectively "unprimed," pressure ports may be placed in openings of personality module 322 as appropriate to enable certain wells to be pressurized, while other wells will be sealed. Personality module 322 may be configured to enable multiple wells to be primed or filled at one time. As discussed above, top plate 334 is typically arranged to accommodate personality modules 322 which are suitable for use with different chips 304.

To enable a user to view chip 304 during a priming process to determine, for instance, whether the chip is being filled correctly, or to inspect for dead volume nucleation sites that contain air bubbles which either block or impede flow, observation windows may be included in top plate 334 and in personality module 322. As shown, a window 344 in top plate 334 and a window 346 in personality module 322 are arranged such that window 344 substantially overlaps window 346. Windows 344, 346 are positioned such that a top surface of chip 304 may be observed during priming. In one embodiment, chip 304 may include windows which enables a user to observe movement of fluids through the capillaries or channels of chip 304.

Personality module 322 may be secured with respect to top plate 334 by inserting screws through threaded apertures 336 in personality module 322 and corresponding apertures 337 in top plate 334. Fasteners such as screws, e.g., thumbscrews 338, may be inserted through openings 340 in top plate 334 and screwed into openings (not shown) in base plate 310 in order to substantially immobilize chip 304 between personality module 322 and base plate 310. The use of thumbscrews 338 to secure top plate 334 against base plate 310 such that chip 304 is held therebetween during priming enables top plate 334 to be easily coupled to and decoupled from base plate 310.

Figure 4:
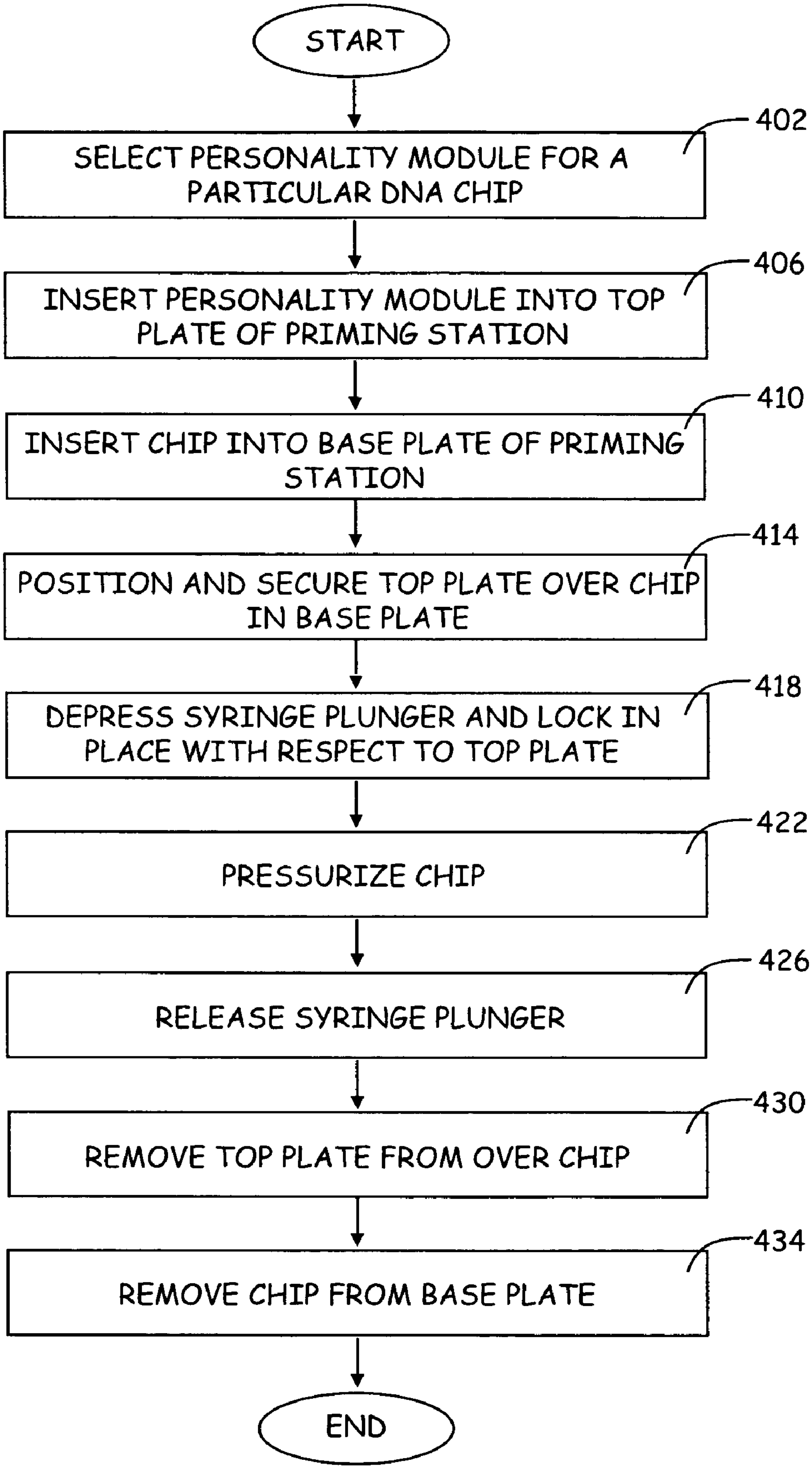
FIG. 4 is a process flow diagram which illustrates a method of using a priming station which includes a personality module will in accordance with an embodiment of the present invention.

Referring next to FIG. 4, one method of using a priming station, or a chip loading station, which includes a personality module and is arranged to be used with a manual pump will be described in accordance with an embodiment of the present invention. A method of using a priming station begins at step 402 in which when it is desired for a particular chip to be primed, a personality module for the chip is selected. As previously described, personality modules are generally adapter pieces which enable a single overall priming station to be used to prime chips of different configurations. The configurations include, but are not limited to, single channel DNA configurations and multiple channel DNA configurations.

Once an appropriate personality module is selected, the personality module is inserted into the top plate of the priming station in step 406. Inserting the personality module into the top plate generally includes aligning the personality module within the top plate, then securing the personality module within the top plate using mechanisms such as screws. After the personality module is inserted into the top plate, the chip that is to be primed is inserted in step 410 into the base plate of the priming station. Inserting the chip into the base plate may include passing a sipper on the chip through a sipper hole in the base plate. It should be appreciated that in one embodiment, the chip may be inserted into the base plate prior to inserting the personality module into the top plate.

Generally, wells on a chip which are to be primed for an application such as sample analysis are filled with a fluid, e.g., a matrix mixture or a dye mixture, which is to be drawn through channels in the chip during pressurization. Drawing the fluid through the channels during pressurization generally prevents air bubbles from forming within the channels and prevents dead volume nucleation sites from forming. As such, prior to placing the chip into a base plate, appropriate wells may be at least partially filled with a fluid. Additionally, since priming may also serve to draw a marker mix into the channels of a chip through a particular well, a well may be at least partially filled with the marker mix before the chip is positioned on or within a base plate. The partial filling is often accomplished through the use of a pipette.

In step 414, the top plate, to which the personality module is coupled, is positioned over the chip and, hence, the base plate. When the top plate is in a proper position with respect to the chip, the top plate is then secured over the chip. As described above with respect to FIG. 1, a set of thumbscrews may be used to physically couple the top plate to the base plate such that the chip is effectively held by the base plate and secured between both the base plate and the top plate.

After the top plate is positioned and secured over the base plate, a syringe plunger may be depressed and locked into place with respect to the top plate in step 418. In one embodiment, the syringe plunger may be depressed from approximately a 10.0 mL mark to approximately a 3.0 mL mark, and locked into place using a clip. Locking the depressed syringe plunger into place with respect to the top plate enables the chip to be pressurized in step 422. When the chip has been pressurized as appropriate, e.g., as desired for a given application, then the syringe plunger is released in step 426.

Once the syringe plunger is released and, in one embodiment, unlocked, the top plate is removed in step 430 from over the chip. Removing the top plate from the base plate may include unscrewing the thumbscrews, and lifting the top plate off of the base plate. In step 434, the pressurized or primed chip is removed from the base plate, and the process of priming a chip is completed.

Although only a few embodiments of the present invention have been described, it should be understood that the present invention may be embodied in many other specific forms without departing from the spirit or the scope of the present invention. By way of example, a personality module and a top plate of a priming station have been described as being substantially separate such that the personality module and the top plate are coupled together using a coupler such as a set of screws. It should be understood, however, that a personality module and a top plate may be formed as substantially a single, integral piece. In other words, for each chip configuration, there may be an appropriate top plate that effectively incorporates the characteristics of a personality module such that the top plate includes a personality or adapter portion. The use of a top plate which effectively has an incorporated personality module may save time in a priming process by eliminating the need to insert a suitable personality module into a top plate before priming a chip.

In one embodiment, a personality, or adapter, module of a top unit is removably coupled to a top plate such that the personality module may be quickly removed and replaced by another personality module. For instance, the personality module may be arranged to be snap-fitted into the top plate. A snap-fit may be implemented by providing personality modules with mechanisms which include, but are not limited to, spring-loaded extensions. Spring-loaded extensions may be compressed, e.g., retracted, to enable a personality module to either be placed into or removed from a top plate. Alternatively, spring-loaded extensions may be decompressed, e.g., expanded, such that the extensions effectively mate with receptacles in the top plate to secure the personality module with respect to the top plate.

An overall priming station of module may enable a single base plate configuration to be used for substantially any chip configuration. That is, in lieu of a base plate being configured to support a chip with a chip assembly of a particular size, e.g., either a 50 mm format or a 70 mm format, a base plate may be configured to substantially securely support chip assemblies of both a 50 mm format and a 70 mm format. The use of such a base plate further increases the efficiency of a priming module, as a single priming module with personality modules may then be used to prime chips with different footprints, or sizes. In one embodiment, a base plate that may accommodate chips of different sizes may include common pins, e.g., pins such as pins 112 of FIG. 1, that may be shared by chips of different sizes, and differently sized indentations. The shared pins and differently sized indentations may cooperate to enable chips of different sizes to be seated within the base plate. In another embodiment, shared pins may be repositioned to effectively be reconfigured for a particular chip type, or size.

Typically, substantially any chip or sample substrate may be primed using a priming station as described above. While a chip which includes one or more sippers has been described as being suitable for priming using a priming station of the present invention, a chip which does not include a sipper, such as a planar chip, a protein chip, or a fluorogenic chip, may also be primed using a priming station of the present invention.

As described above, a priming station is used with different personality modules which are selected based upon the configuration of a chip which is to be primed. Personality modules have also been described as being suitable for enabling more than one well in a chip to be primed substantially simultaneously. It should be appreciated that a single personality module may be used to prime any number of wells in a chip substantially simultaneously. That is, in one embodiment, a single personality module may be configured such that the configuration of the pressure ports (and seals) in the cavities of a selected personality module is varied to prime different pluralities of wells on different chips.

Priming a substrate or a chip such as a DNA sipper chip has been described as pressurizing individual wells located on the chip, as for example by drawing fluids or solutions through the wells and channels of the chip. In general, priming may also refer to pressurizing channels or capillaries, e.g., capillaries that may interconnect wells, of a chip. That is, pressurizing wells may include pressurizing channels which are fluidly coupled to the wells. Fluid circuits associated with the wells may be independently connected to one or more wells. Further, as will be understood by those skilled in the art, priming may also involve initiating a sipper for use during testing.

In general, the steps associated with using a personality module as a part of a priming process may vary. Steps may generally be added, removed, altered, and reordered. For instance, a chip may be positioned within a base plate prior to selecting an appropriate personality module for use with the chip, as mentioned above. In addition, for a priming station which is arranged to be used with an automatic pump, the steps associated with locking a syringe plunger into place may be removed without departing from the spirit or the scope of the present invention. Therefore, the present examples are to be considered as illustrative and not restrictive, and the invention is not to be limited to the details given herein, but defined by the appended claims along with their fair scope of equivalents.

What is claimed is:

1. A method for simultaneously preparing a plurality of separation networks in a microfluidic device for a separation, each separation network being externally and fluidly accessible through a priming reservoir and a sample reservoir, comprising the steps of:

(a) dispensing a separation medium into one or more of the priming reservoirs fluidly connected to the plurality of the separation networks;

(b) sealing a priming block against the one or more priming reservoirs;

(c) driving separation medium from the one or more priming reservoirs into the plurality of separation networks with the priming block to simultaneously fill the separation networks with the separation medium;

(d) transferring a plurality of samples from a sample array to the sample reservoirs in fluid connection with the plurality of filled separation networks, thereby preparing the plurality of separation networks contained in the microfluidic device for a separation; and (e) after performing steps (a) through (d), transferring the microfluidic device to an analyzer for separation and analysis of the prepared separation networks.

2. The method of claim 1, wherein said driving is achieved using air pressure.

3. The method of claim 1, wherein said driving is achieved using fluid pressure.

4. The method of claim 1, wherein eight separation networks are filled simultaneously.

5. The method of claim 1, further comprising after step (c), the step (c-2) of determining the operativity of each of said filled separation networks for electrophoretic separations.

6. The method of claim 5, wherein said determining step comprises visually monitoring said separation networks.

7. The method of claim 1, conducted automatically.

8. A method for simultaneously preparing a plurality of fluid networks in a microfluidic device for DNA analysis, each fluid network being externally and fluidly accessible through a reservoir and a sample port on the microfluidic device, comprising the steps of:

(a) dispensing fluid into one or more of the reservoirs fluidly connected to the plurality of the fluid networks;

(b) sealing a priming block against the one or more reservoirs;

(c) driving fluid into the plurality of fluid networks simultaneously with the priming block to simultaneously fill the fluid networks;

(d) transferring a plurality of samples from a sample array to the sample ports in fluid connection with the plurality of filled fluid networks, thereby preparing the plurality of fluid networks contained in the microfluidic device for a DNA analysis; and (e) after performing steps (a) through (d), transferring the microfluidic device to an analyzer for DNA analysis of the prepared fluid networks.

9. The method of claim 8, wherein said driving is achieved using fluid pressure.

10. The method of claim 8 wherein eight fluid networks are filled simultaneously.

11. The method of claim 8, further comprising after step (c), the step (c-2) of determining the operativity of each of said filled fluid networks for DNA analysis.

12. The method of claim 11, wherein said determining step comprises visually monitoring said fluid networks.

13. The method of claim 8, conducted automatically.

* * * * *